United States Patent
Leijon et al.

(10) Patent No.: US 7,768,176 B2
(45) Date of Patent: Aug. 3, 2010

(54) POWER STORAGE SYSTEM WITH LOW VOLTAGE AND HIGH VOLTAGE WINDINGS FOR A VEHICLE DRIVING SYSTEM

(75) Inventors: Mats Leijon, Uppsala (SE); Hans Bernhoff, Uppsala (SE); Bjorn Bolund, Uppsala (SE)

(73) Assignee: Electric Line Uppland AB, Uppsala (SE)

( * ) Notice: Subject to any disclaimer, the term of this patent is extended or adjusted under 35 U.S.C. 154(b) by 415 days.

(21) Appl. No.: 10/534,186

(22) PCT Filed: Nov. 17, 2003

(86) PCT No.: PCT/SE03/01780
§ 371 (c)(1),
(2), (4) Date: May 6, 2005

(87) PCT Pub. No.: WO2004/045884
PCT Pub. Date: Jun. 3, 2004

(65) Prior Publication Data
US 2006/0096796 A1    May 11, 2006

(30) Foreign Application Priority Data
Nov. 18, 2002    (SE) .................................. 0203434

(51) Int. Cl.
*H02K 16/04* (2006.01)
*H02K 7/02* (2006.01)
(52) U.S. Cl. .................. 310/266; 310/74; 310/180; 310/184; 310/268; 322/4; 322/90; 180/65.31

(58) Field of Classification Search .................. 310/74, 310/83, 179, 180, 208, 266, 268, 113; 322/4, 322/90; 180/65.2, 65.3, 65.5
See application file for complete search history.

(56) References Cited

U.S. PATENT DOCUMENTS

| | | | | |
|---|---|---|---|---|
| 4,163,187 A | * | 7/1979 | Thomas | 322/29 |
| 4,163,915 A | * | 8/1979 | Fong | 310/198 |
| 4,211,945 A | * | 7/1980 | Tawse | 310/112 |

(Continued)

FOREIGN PATENT DOCUMENTS

DE    19718480 A1    11/1997

(Continued)

OTHER PUBLICATIONS

Aanstoos et al., "High Voltage Stator for a Flywheel Energy Storage System", IEEE Transactions on Magnetics, vol. 37, No. 1, Jan. 2001.*

*Primary Examiner*—Karl I Tamai
(74) *Attorney, Agent, or Firm*—Seyfarth Shaw LLP

(57) ABSTRACT

The invention relates to a power storage system intended to transmit power to and from a driving system of a vehicle. A power storage having a stator provided with two windings and at least one rotor provided with a magnetic-flux generating device is comprised. The rotor is connected to a flywheel intended for storage of energy. The two windings of the stator are arranged for high and low voltage, respectively. The power storage is arranged to transmit power to and from the electric apparatus as well as store energy transmitted from the electric apparatus in the flywheel.

8 Claims, 3 Drawing Sheets

U.S. PATENT DOCUMENTS

| | | | |
|---|---|---|---|
| 4,412,170 A * | 10/1983 | Roesel, Jr. | 322/4 |
| 4,444,444 A * | 4/1984 | Benedetti et al. | 310/90.5 |
| 5,124,605 A * | 6/1992 | Bitterly et al. | 310/74 |
| 5,739,609 A * | 4/1998 | Ueyama et al. | 310/90.5 |
| 5,783,893 A * | 7/1998 | Dade et al. | 310/266 |
| 6,069,424 A * | 5/2000 | Colello et al. | 310/58 |
| 6,098,735 A * | 8/2000 | Sadarangani et al. | 180/65.2 |
| 6,163,097 A * | 12/2000 | Smith et al. | 310/261 |
| 6,172,435 B1 * | 1/2001 | Tanaka | 310/74 |
| 6,175,172 B1 * | 1/2001 | Bakholdin et al. | 310/74 |
| 6,177,746 B1 * | 1/2001 | Tupper et al. | 310/166 |
| 6,388,347 B1 * | 5/2002 | Blake et al. | 310/74 |
| 6,470,984 B1 * | 10/2002 | Nakajima et al. | 180/65.2 |
| 6,590,312 B1 * | 7/2003 | Seguchi et al. | 310/266 |
| 6,753,619 B2 * | 6/2004 | Stevenson et al. | 290/1 R |
| 6,798,105 B1 * | 9/2004 | Nilson | 310/179 |
| 6,917,272 B2 * | 7/2005 | Valdemarsson | 336/174 |
| 2002/0047413 A1 * | 4/2002 | Leijon et al. | 310/112 |
| 2002/0060505 A1 * | 5/2002 | Kawamura | 310/184 |
| 2002/0100624 A1 * | 8/2002 | Joong et al. | 180/65.4 |
| 2003/0057788 A1 * | 3/2003 | Natsuhara et al. | 310/179 |
| 2004/0217723 A1 * | 11/2004 | Cai et al. | 318/268 |
| 2006/0096796 A1 * | 5/2006 | Leijon et al. | 180/65.3 |

FOREIGN PATENT DOCUMENTS

| | | |
|---|---|---|
| EP | 0437266 A2 | 1/1991 |
| FR | 2806979 A1 | 10/2001 |
| WO | WO 82/00117 | 1/1982 |
| WO | WO 9745935 A1 * | 12/1997 |
| WO | WO 9917427 A1 * | 4/1999 |
| WO | WO 0135514 A1 * | 5/2001 |
| WO | WO 0219353 A1 * | 3/2002 |
| WO | WO 03063187 A1 * | 7/2003 |
| WO | WO 2004/045884 A1 | 6/2004 |

* cited by examiner

POWER STORAGE SYSTEM WITH LOW VOLTAGE AND HIGH VOLTAGE WINDINGS FOR A VEHICLE DRIVING SYSTEM

This application is a U.S. National Phase of International Patent Application Ser. No. PCT/SE2003/001780, filed Nov. 17, 2003 which claims priority to Swedish Patent Application No. 0203434-6 filed Nov. 18, 2002.

TECHNICAL FIELD OF THE INVENTION

The present invention relates to a power storage system intended to store and transmit power to and from a driving system of a vehicle. The system comprises a power storage having a stator provided with winding and at least one rotor provided with a magnetic-flux generating device. The rotor is connected to at least one flywheel intended for storage of energy in the form of kinetic energy in at least one rotary mass. The driving system comprises an electric apparatus, the power storage being arranged to transmit power to and from said electric apparatus.

BACKGROUND ART

Power storage systems having a flywheel that is charged by a driving object and subsequently serves as source of power for, e. g., an electric motor is used, inter alia, in driving systems such as a driveline of a vehicle. However, known systems are limited, the energy storage capacity is limited by many factors such as the weight of the system, security requirements, the availability of suitable materials as well as the availability of suitable driving systems for the recharging of the flywheel and for the discharging of the same. In a driveline in a hybrid vehicle, an energy storage is found, which, e.g., may be a battery and/or a fuel tank, an electric drive motor and/or an internal combustion engine.

To be able to make use of the energy at retardation of a vehicle, for instance an automobile or a train, a fast system that manages to transmit and store high powers is required. The stronger the retardation is, the higher power the system has to be able to handle in order to make use of the energy.

A known system for storage of kinetic energy is shown in U.S. Pat. No. 5,931,249. The system described according to the document comprises a flywheel, intended for accumulation and discharging of energy, respectively, which is coupled to an electric apparatus operating as motor and generator, respectively, depending on whether energy is fed to or from the flywheel. When the system is used in a vehicle, during shorter periods of time the vehicle may be driven from the flywheel. The flywheel rotates at a high speed in vacuum. Together with the system described, high currents are required, which results in high losses if high power is to be handled. Thus, the known system is not suitable for high powers.

Today's batteries are limited in respect of the power that they manage to carry. This entails that the charging time for battery-powered vehicles generally amounts to several hours. A battery-powered vehicle cannot be driven more than a limited range before the vehicle has to be brought to a recharging station and there be recharged during a relatively long time before the vehicle again has a certain range, frequently in the range of 100 km.

BRIEF DESCRIPTION OF THE INVENTION

The invention according to the present application is intended to provide a power storage system intended for storage and discharging of energy in a driving system of a vehicle that solves the above-described problems. The system comprises a power storage having a stator provided with two windings and a rotor provided with a magnetic-flux generating device. The first winding of the stator is intended for low voltage for the transmission of energy of low power, while the is second winding is intended for high voltage for the transmission of high power. The rotor is connected to a flywheel intended for storage of kinetic energy in at least one rotary mass. The power storage system is arranged to transmit power in both directions between the power storage and an electric apparatus comprised in the driving system. By choosing to provide the stator with a high-voltage winding, very high power can be transmitted in both directions in the system. Thanks to this, the system becomes very fast and manages to handle the power that is developed during fast dynamical processes.

With low voltage is meant voltage below 380 V and with high voltage is meant voltage above 380 V.

In a preferred embodiment, said first winding is arranged to operate at a voltage that is in the interval of 6-50 V.

In a further, preferred embodiment, said second winding is arranged to operate at a voltage that is in the interval of 1-24 kV.

In a further, preferred embodiment, at least one of said windings comprises a conductor surrounded by a first semi-conducting layer, said first semiconducting layer is then surrounded by a layer of fixed insulation, said first layer of fixed insulation is then surrounded by a second semiconducting layer. By means of a winding having this type of insulation system, a very high power can be transmitted.

In a further, preferred embodiment, in said driving system an energy storage is comprised, which may be a battery, that is connected with the electric apparatus of the driving system. Power may be transmitted from the power storage to the energy storage and vice versa. By arranging the windings in the stator in such a way that they are controlled entirely independently of each other, at every instant a battery in a driving system can be utilized in an optimal way regarding discharging and recharging. In a hybrid vehicle being driven in the position of battery operation thereof, i.e. when the fuel engine of the vehicle is not used, for instance during driving of a bus in an urban environment, fast processes that require high power can be regulated via the power storage/flywheel while continuous energy is fed to the driving system via the battery of the vehicle during battery operation. Thus, at fast and strong retardations energy is fed to the flywheel for accumulation and is fed out therefrom when power requirement is at hand, as, for instance, at variations of torque or demands of quick acceleration of the vehicle.

Further, by the fact that both windings of the stator are intended to operate at high and low voltage, respectively, the system enables energy to be fed very fast to and from the flywheel via the high-voltage winding, as energy to and from the battery is fed with appropriate voltage via the low-voltage winding of the stator. The windings operate entirely independently of each other, and therefore the load of the battery can be adapted in a way that is favorable to the condition and service life of the battery. Then, at every instant the battery can operate in a way being appropriate to the battery, while fast and power-demanding variations of operation such as accelerations and strong retardations, are managed via the flywheel and the high-voltage winding of the stator, which enables quick transmission of energy in a very short time to and from the flywheel of the system.

In a preferred embodiment, the flywheel is charged with energy that has been transmitted from an external source. In a battery-powered vehicle, by utilizing a driving system having a power storage system according to the present invention, the battery of the vehicle can, on one hand, be recharged in a conventional way at a recharging station, and the flywheel can, on the other hand, be charged maximally with energy. During operation, the energy accumulated in the flywheel may then be used for the propulsion of the vehicle, thereby increasing the range of the vehicle considerable, or alternatively the energy may be used for continued recharging of the battery of the vehicle. In this way, the battery may be charged continuously during a longer period of time, while the downtime at the recharging station yet becomes considerable shorter.

In a preferred embodiment, said magnetic-flux generating device in the rotor comprises permanent magnets, In another preferred embodiment, said magnetic-flux generating device in the rotor comprises a squirrel cage winding.

In a further, preferred embodiment, said rotor is mounted with magnetic bearings.

The rotor is, in a further, preferred embodiment, mounted with both magnetic bearings and sliding bearings.

In a further, preferred embodiment, said stator is air-gap wound.

In a further, preferred embodiment said power storage is gyro suspended. By choosing a gyro suspended power storage, the driving properties of the vehicle will only be affected on a small scale.

In a further, preferred embodiment, said flywheel comprises at least two rotary masses that are arranged to rotate in opposite directions of rotation in relation to each other. By using counter-rotating masses, the forces that arise in the system at rotation of the same are minimized.

In a further, preferred embodiment, said rotor comprises a first core, a second core as well as a third core. The first winding is arranged in the air gap between the first and the second core and the second winding is arranged in the air gap between the second and the third the core. By means of this configuration, the first and the second winding are magnetically disconnected from each other and can thereby operate entirely independently of each other.

The system according to the present invention may be used together with any vehicle, for instance automobile, train, aeroplane, boat. The above-described system has high efficiency, above 90%, and reacts very fast, in the range of a few milliseconds. The system is compact, robust and durable, which is a prerequisite for use in severe environment, which is the case in most types of vehicles. The system manages to generate and absorb high powers.

DETAILED DESCRIPTION OF PREFERRED EMBODIMENTS

Figure 1:
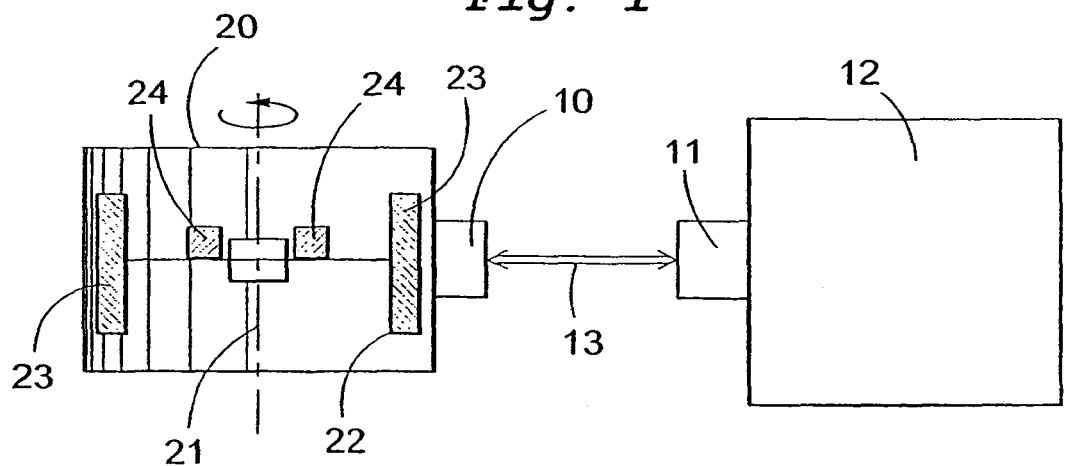
FIG. 1 shows a driving system of a vehicle having a power storage system according to the present invention.

FIG. 1 shows a power storage system according to the present invention. A power storage 20 having a stator 24 and a rotor 21 that is connected to a flywheel 22 is—via a first converter 10, a direct current transmission 13 and a second converter 11—arranged to transmit power to and from an electric apparatus 12. The flywheel 22 comprises a rotary mass 23. When power is transmitted from the electric apparatus 12 to the power storage 20, which, for instance, is the case at retardation of an electrically driven vehicle, the apparatus 12 operates as generator and power is transmitted from the apparatus 12 via the converter 11, the direct current transmission 13 and the converter 10 to a winding (not shown in figure) comprised in the stator 24 and is then stored in the flywheel 22 in the form of kinetic energy in the rotary mass 23. The kinetic energy stored in the rotary mass 23 may subsequently, if required, be correspondingly transmitted to the electric apparatus. Then the electric apparatus operates as motor. This system may be used in the driveline of a vehicle, and the power storage 20 is then used both as power buffer and energy buffer. The stator comprises two windings, with the first winding being intended for low voltage for the transmission of energy of low power, while the second winding is intended for high voltage for the transmission of high power. The stator's winding in which high power is transmitted is arranged to operate at high voltage over 380 V, preferably in the interval of 1-24 kV. By said arrangement, very high power can be transmitted to and from the power storage 20. Thanks to this, the system manages to handle the high powers that arise at, for instance, strong retardations.

Figure 2:
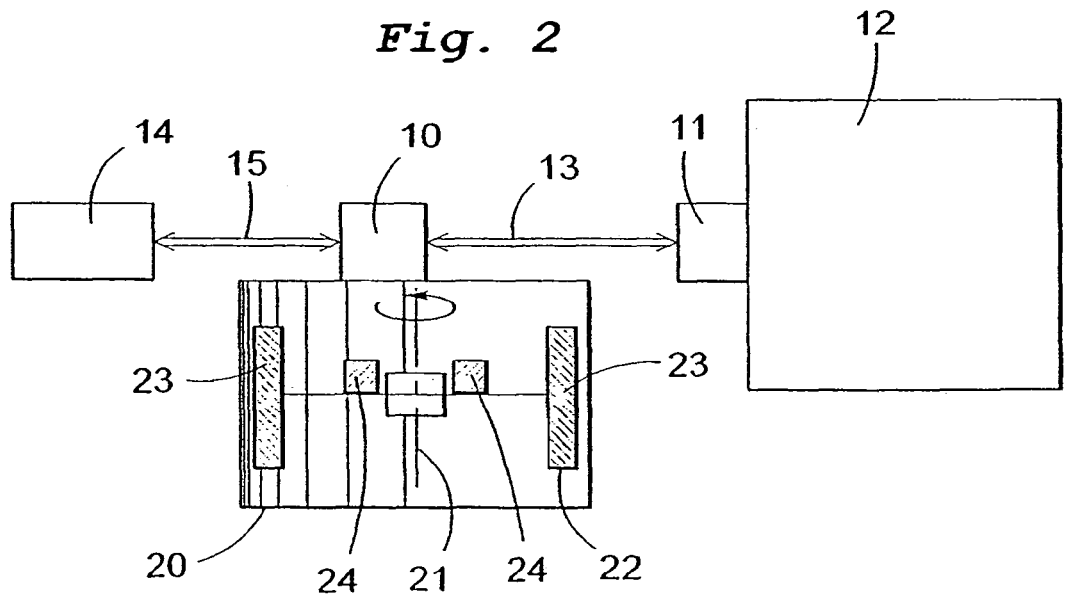
FIG. 2 shows a further driving system of a vehicle having a power storage system according to the present invention.

FIG. 2 shows a system having an energy storage 14 that may be a battery, a fuel cell, or other chemically stored energy such as a fuel tank of an internal combustion engine, and a power storage 20 comprising a stator 24 and a rotor 21 connected to a flywheel 22 having a rotary mass 23. The stator 24 is provided with a first and a second winding (not shown in figure). The respective windings are arranged to operate at low voltage and at high voltage, respectively. With low voltage is meant voltage lower than 380 V and with high voltage is meant voltage higher than 380 V. The rotor 21 is provided with a suitable magnetic-flux generating device such as, for instance, permanent magnets or an induction winding. The flywheel 22 is intended for accumulation and quick transmission of power to and from the driving system. Further, the power storage system comprises two converters 10 and 11 having an intermediate direct current transmission 13. One of the converters, converter 11, is arranged in connection with an electric apparatus 12. As in the system shown in FIG. 1, the electric apparatus 12 operates either as motor or as generator depending on present mode of operation. At retardation of a vehicle provided with this system, the apparatus 12 operates as generator and the generated power is transmitted via the converter 11 and the direct current transmission 13, which can operate at high voltage as, e. g., 1.2 kV, via the converter 10 to the high-voltage winding of the stator and further to the power storage 20, where the energy is stored in the form of kinetic energy in the rotary mass 23 of the flywheel. By the fact that the power is transmitted at high voltage from the high-voltage winding of the stator, high powers, such as braking power at strong retardation of a vehicle, can be made use of and stored. The power accumulated in the flywheel may subsequently be used in fast processes, such as variations of torque or quick acceleration of a vehicle, when the energy from the flywheel can be brought back very fast to the driving system via the high-voltage winding of the stator. Alternatively, in the case where the energy storage 14 consists of a battery, the energy stored in the flywheel may be used to recharge the battery. Then, the energy is transmitted at low power and low voltage to the battery via the low-voltage winding of the stator.

Figure 3:
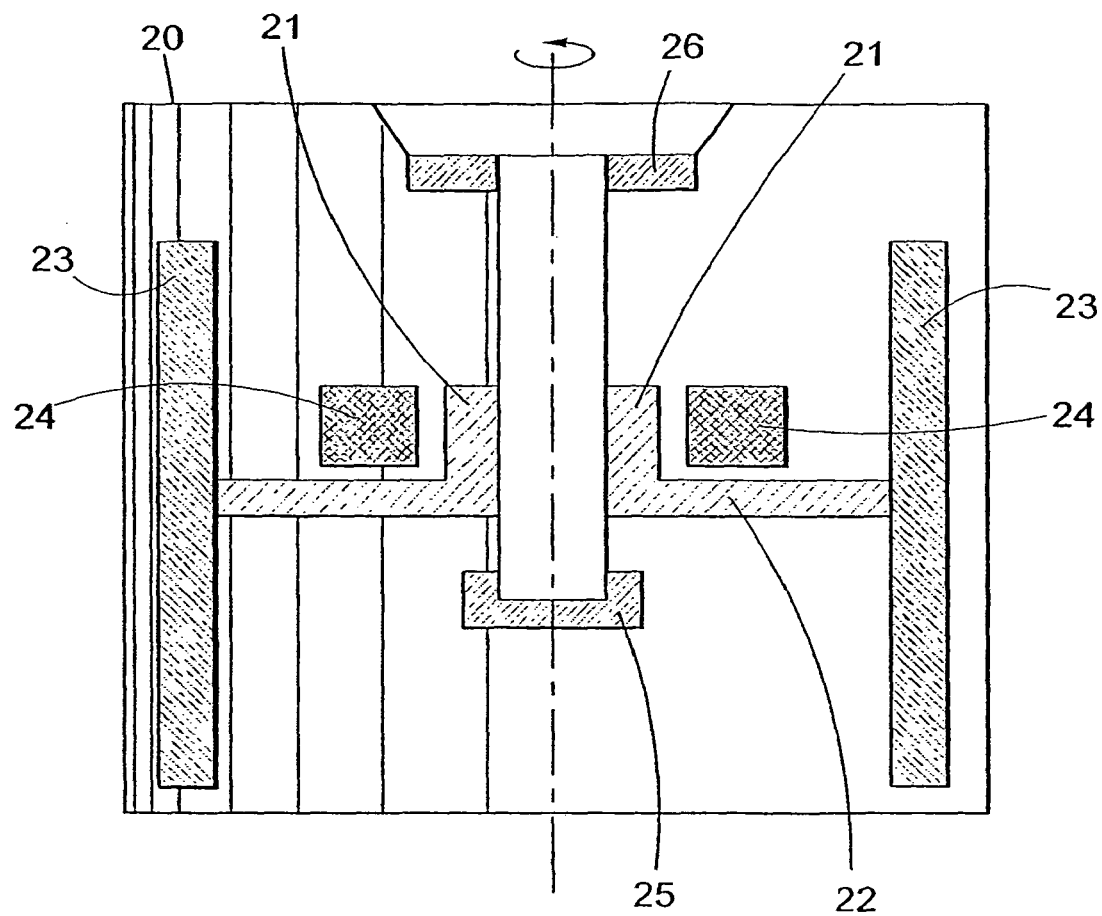
FIG. 3 shows a power storage that is comprised in the system according to the present invention.

FIG. 3 shows a power storage of the type that is comprised in both of the above-described systems according to FIGS. 1 and 2. The rotor 21 is mounted with a journal bearing 25 and a guide bearing 26, respectively. The bearings may be conventional bearings or magnetic or a combination of magnetic bearings and sliding bearings. The rotor 21 is connected to a flywheel 22 provided with a rotary mass 23. Further, the power storage comprises a stator 24 provided with a first and a second winding (not shown in figure). During operation, power is transmitted between the stator 24 and the rotor 21, and thereby the flywheel 22 having the rotary mass 23, via one of the windings of the stator.

Figure 4:
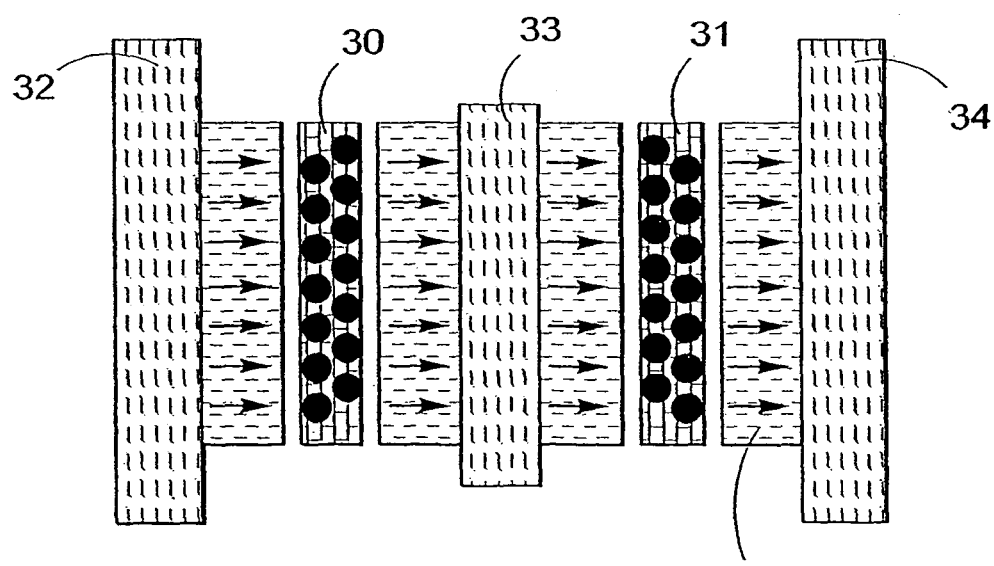
FIG. 4 shows an embodiment of the stator comprised in the power storage.
Figure 5:
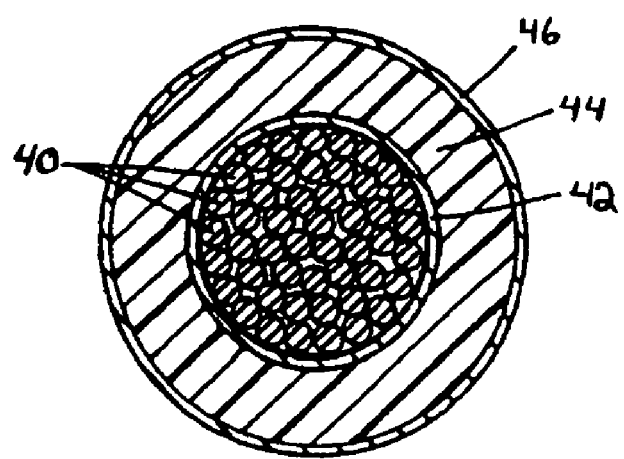
FIG. 5 shows an embodiment of a winding.

FIG. 4 shows an embodiment of an air-gap wound stator 24. A first winding 31 is arranged between first and second cores 32, 33 arranged in the rotor. A second winding 31 is arranged between the second core 33 and a third core 34 arranged in the rotor. By means of this configuration, the first winding 30 and the second winding 31 are magnetically disconnected from each other and can, thereby, be controlled entirely independently of each other. The arrows 35 show the direction of the magnetic field.

The stator and rotor of the power storage may be arranged to operate with either radially or axially directed magnetic flux.

The invention is not limited to the above embodiments given as examples, but may be made as modifications within the scope of the general idea according to the invention described in the appended claims.

In a further, preferred embodiment, at least one of said windings 30,31 comprises a conductor 40 surrounded by a first semiconducting layer 42, said first semiconducting layer 42 is then surrounded by a layer of fixed insulation 44, said first layer of fixed insulation 44 is then surrounded by a second semiconducting layer 46. By means of a winding having this type of insulation system, a very high power can be transmitted.

The invention claimed is:

1. A power storage system which transmits power to and from a vehicle driving system the system comprising:
a vehicle driving system comprising at least one electric apparatus,
a power storage coupled to the electric apparatus and having a stator-provided winding and at least one rotor provided with a magnetic-flux generating device, said rotor being connected to at least one flywheel intended for storage of energy in the form of kinetic energy in at least one rotary mass, said power storage being arranged to transmit power to and from said electric apparatus, wherein said stator comprises at least a first winding arranged to transmit power to and from the electric apparatus at a voltage that is in the interval of 6 to 50 volts as well as a second winding arranged to transmit power to and from the electric apparatus at a voltage that is in the interval of 1 to 24 kV, said first and second windings being arranged to operate independently of each other, wherein at least one of said windings comprises a conductor surrounded by a first semiconducting layer, said first semiconducting layer is then surrounded by a layer of fixed insulation, said first layer of fixed insulation is then surrounded by a second semiconducting layer wherein said rotor comprises a first core, a second core as well as a third core, the first winding of the stator being arranged between said first and said second core and the second winding of the stator being arranged between said second and said third core.

2. Power storage system according to claim 1, wherein at least one energy storage is comprised, which energy storage is connected with said electric apparatus, said power storage being arranged to transmit power to and from said energy storage.

3. Power storage system according to claim 1, wherein said power storage is arranged to receive power that has been transmitted from an external source.

4. Power storage system according to claim 1, wherein said magnetic-flux generating device in the rotor comprises permanent magnets.

5. Power storage system according to claim 1, wherein said magnetic-flux generating device in the rotor comprises a squirrel cage winding.

6. Power storage system according to claim 1, wherein said rotor is mounted with magnetic bearings.

7. Power storage system according to claim 6, wherein said rotor also is mounted with sliding bearings.

8. Power storage system according to claim 1, wherein said stator is air-gap wound.

* * * * *